Dec. 8, 1959 A. D. PETRANGELO 2,916,564

TWO-STEP TELEPHONE HOOKSWITCH

Filed March 14, 1958

*INVENTOR.*

AMEDIO D. PETRANGELO

*BY* [signature]

AGENT

United States Patent Office 2,916,564

Patented Dec. 8, 1959

2,916,564

TWO-STEP TELEPHONE HOOKSWITCH

Amedio D. Petrangelo, Rochester, N.Y., assignor to General Dynamics Corporation, Rochester, N.Y., a corporation of Delaware Application March 14, 1958, Serial No. 721,454

3 Claims. (Cl. 179—164)

My invention relates generally to telephone hookswitches, and more particularly to two-step hookswitches adapted for use in wall mounting telephone subsets.

A conventional telephone subset has a transmitter, receiver, and means comprising a set of hookswitch contacts for connecting the transmitter and receiver to a telephone line. It is sometimes desirable to arrange the means for actuating the hookswitch contacts to cause the contact set to operate through a first step which is effective to connect only the receiver to the line when the handset including the transmitter and receiver is removed from the subset cradle. In such a subset, releasing means manually controlled by the user of the subset is thereafter operated to cause the hookswitch contact actuating means to operate the contact set through a second step which is effective to connect the transmitter to the line. Such releasing means traditionally includes an extra button or plunger extending through an opening of the subset housing independently of the hookswitch actuating mechanism and cradle on which the handset is received. Telephones including such releasing buttons or plungers require special housings, as well as an extra plunger-controlled device, for modifying the operation of the hookswitch contact set in order to convert a subset having a single step hookswitch mechanism to the above-outlined two-step operation.

Accordingly it is an object of my invention to provide a subset having a new and improved hookswitch mechanism.

Another object of my invention is to provide a telephone subset having a new and improved two-step hookswitch mechanism.

Another object of my invention is to provide a new and improved hookswitch mechanism that is particularly suited to a wall mounted subset.

Another object of my invention is to provide a new and improved subset hookswitch mechanism which may be readily changed from single-step operation to two-step operation and vice versa.

Another object of my invention is to provide a new and improved subset hookswitch mechanism which does not require the use of special parts to accomplish conversion from single- to two-step hookswitch operation.

Further objects and advantages of my invention will become apparent in the following description. For a better understanding of my invention, reference is made in the following description to the drawings attached to and forming a part of the present specification and in which.

Figure 1:
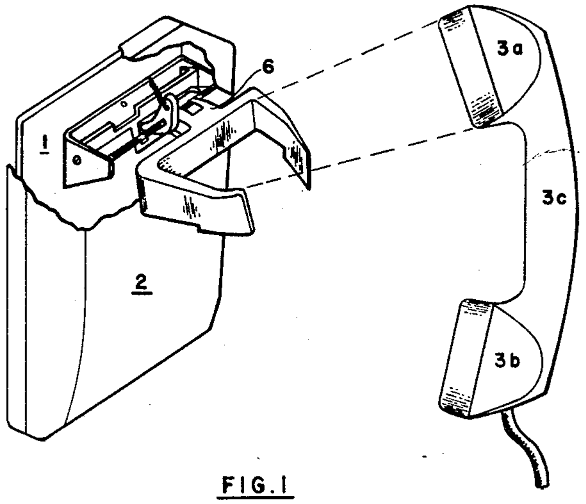
Fig. 1 shows a partial, cut away view of a telephone subset.

Referring to Fig. 1, I provide a wall mounted telephone subset having a base 1 on which electrical elements used in the subset circuit may be mounted and a shell 2 covering base 1 and the components. The subset also includes a handset of the well-known type in which the subset receiver and transmitter are contained in portions **3*a* and 3*b*, respectively; portions 3*a* and 3*b* being connected by handle portion 3*c*. The receiver portion 3*a* cooperates with hookswitch arm 6, which in turn is movably attached to bracket 5** in the manner set forth in the following paragraph. Because neither the circuit nor any circuit elements other than those presently described forms an integral part of my invention and because both circuit and elements are well understood by those skilled in the art, I do not describe the operation of circuit or its elements in detail in the succeeding paragraphs.

Figure 2:
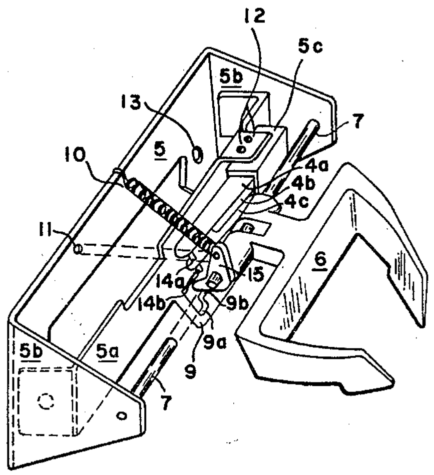
Fig. 2 is a detail of a hookswitch assembly used in the subset shown in Fig. 1.

Referring to Fig. 2, the subset also has a conventional hookswitch contact set including flat springs **4*a*—4*b* and 4*c*—4*d* which are insulated from each other, arranged in a stack, and positioned with respect to base 1 by means comprising bracket 5. Bracket 5 is fixed on base 1 by conventional means such as screw 13. Bracket 5 is preferably formed of flat stock and has ends 5*b* extending parallel to each other and at right angles to base 1. Bracket 5 also includes portion 5*a* running between, and fixed to, ends 5*b*. The spring stack is fixed to ear 5*c* on bracket portion 5*a***, and is to be described in more detail presently.

The subset also includes means comprising hookswitch arm 6 for receiving portions **3*a* of the handset in the conventional manner when the subset is not in use. Arm 6 has a journaled portion which is received by shaft 7 extending between ends 5*b* of bracket 5. Hookswitch arm 6 is constrained to rotate about and to move transversely along the length of shaft 7. The necked portion of arm 6 lying intermediate the journaled and handset receiving portions passes through an opening in shell 2. The shell opening is of a size sufficient to allow arm 6 to be moved within limits to be described presently without interference between arm 6 and shell 2**.

Figure 3:
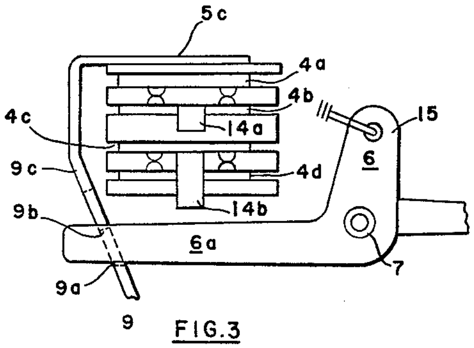
Fig. 3 is a detail of a portion of the hookswitch mechanism.

Referring to Fig. 3, an extension **6*a* on the end of hookswitch arm 6 remote from the handset receiving portion cooperates with pushers 14*a* and 14*b* which are fixed to springs 4*a* and 4*c*, respectively, of the contact set. When the handset is placed on hookswitch arm 6, the weight of the handset rotates arm 6 and portion 6*a* about shaft 7. In the course of such rotation, portion 6*a*, starting from the position shown in Fig. 3, is rotated in a clockwise direction until portion 6*a* engages pusher 14*b* and causes spring 4*c* to be deflected upwardly and out of contact with its corresponding spring 4*d*. Arm 6 continues to rotate, so that spring 4*c* engages pusher 14*a* and causes spring 4*a* to be deflected upwardly to the point where it is disengaged from its corresponding spring 4*b*. Arm 6 continues to rotate until the end of portion 6*a* comes into engagement with surface 9*c* of detent portion 9, which is integral with bracket member 5*a* as shown in Fig. 2. This is the so-called normal condition of the hookswitch mechanism including arm 6**.

When the handset is removed from hookswitch arm 6, biasing means comprising helical spring 8 connected at one end to point 10 on bracket 5 and at the other end to projection 15 on arm 6 urges the handset receiving portion of arm 6 in an upward direction toward a second operated position to be described presently. Spring 8, attached to point 10, is also effective for urging arm 6 to slide along the length of shaft 7 to the point where portion **6*a* overhangs surface 9*b* of the above referred to detent portion 9. Under these conditions, the rotation of arm 6 is arrested when portion 6*a* engages a detent comprising the surface 9*b*. This determines the first operated position of the hookswitch mechanism including the contact set. The springs in the stack are adjusted so that only part of them are made operative when the hookswitch mechanism has been moved from normal to the first operated position. In the embodiment of my invention shown in Fig. 2, when the mechanism is in its first operated position, springs 4$a$ and 4$b$ are in contact with each other to connect (by means not shown) the receiver in portion 3$a$ of the handset to the line. At this time, springs 4$c$ and 4**$d$ are not in contact with each other.

Arm 6 is manually released from the first operated position by sliding arm 6 the length of shaft 7 against the tension of spring 8 to the point where portion 6$a$ is disengaged from surface 9$b$. Arm 6 is then free to rotate further to its second operated position under the influence of spring 8. The second operated position is determined as that point at which portion 6$a$ engages surface 9$a$. In its second operated position, portion 6$a$ of the hookswitch arm is moved out of engagement with pusher 14$b$ so that all springs in the stack are fully operated. At this point springs 4$c$ and 4$d$ are in contact with each other and are effective to connect the transmitter in portion 3$b$ of the handset (by way of other means not shown) to the telephone line.

When the handset is returned to arm 6, arm 6 is rotated about shaft 7 in a direction reverse with respect to the above described rotation, so that arm 6 is returned to its normal position. Spring 8 is effective to cause arm 6 to slide along the length of shaft 7 to the point where portion 6$a$ again overhangs surface 9$b$.

If single-step operation of the hookswitch contact mechanism is to be provided, the end of biasing spring 8 is transferred from its previously described connection at point 10 on bracket 5 to point 11 on bracket 5. Spring 8 so positioned is effective for urging arm 6 to rotate about shaft 7 in the above described manner. However, spring 8 in its new position is effective for urging arm 6 to slide along shaft 7 to the point where portion 6$a$ overhangs surface 9$a$ when arm 6 and the hookswitch mechanism is in normal position. When the handset is removed from arm 6 under these conditions arm 6 is immediately rotated to the above described second operated position. With this arrangement, it is possible to change a subset incorporating my invention from one- to two-step operation or vice versa simply by changing the point at which biasing spring 8 is connected to bracket 5.

While I have shown and described the preferred embodiment of my invention, modifications will be obvious to those skilled in the art. I therefore aim in the appended claims to cover all such modifications as fall within the true spirit and scope of my invention.

What I claim is:

1. In a telephone subset having a handset, a base, a set of hookswitch contacts, and a bracket for positioning said contact set with respect to said base, the combination comprising: a hookswitch arm for receiving said handset, a shaft carried by said bracket for constraining said arm to rotate with respect to said shaft and to move along the length of said shaft, said arm having normal and first and second operated positions with respect to said contact set, means comprising a portion of said arm operative in response to the rotation of said arm for controlling said contact set, a detent carried by said bracket disposed for arresting the rotation of said arm at said first operated position intermediate said normal and said second operated position as said arm is rotated toward said second position, biasing means for sliding said arm along the length of said shaft to overhang said detent when said arm is in said normal position, and said contact controlling means being effective in response to the movement of said arm to various ones of said positions for placing said contact set in a corresponding one of a like number of conditions.

2. In a telephone subset having a handset, a base, a set of hookswitch contacts, and a bracket for positioning said contact set with respect to said base, the combination comprising: a hookswitch arm for receiving said handset, a shaft carried by said bracket for constraining said arm to rotate with respect to said shaft and to move along the length of said shaft, said arm having normal and first and second operated positions with respect to said contact set, means comprising a portion of said arm operative in response to the rotation of said arm for controlling said contact set, a detent carried by said bracket disposed for arresting the rotation of said arm at said first operated position intermediate said normal and said second operated position as said arm is rotated toward said second position, biasing means for sliding said arm along the length of said shaft to overhang said detent when said arm is in normal position and for urging said arm to rotate about said shaft toward said second operated position, said contact controlling means being effective in response to the movement of said arm to various ones of said positions for placing said contact set in a corresponding one of a like number of conditions.

3. In a telephone subset having a handset, a base, a set of hookswitch contacts, and a bracket for positioning said contact set with respect to said base, the combination comprising: a hookswitch arm for receiving said handset, a shaft carried by said bracket for constraining said arm to rotate with respect to said shaft and to move along the length of said arm, said arm having a normal and first and second operated positions with respect to said contact set, means comprising a portion of said arm operative in response to the rotation of said arm for controlling said contact set, a detent carried by said backet for arresting the rotation of said arm at said first operated position intermediate said normal and said second operated positions as said arm is rotated toward said second position, biasing means effective when extended between said arm and a first point on said bracket in a first direction for urging said arm toward said second operated position and effective when extended between said arm and a second point of said bracket in a second direction for urging said arm toward said second operated position and for sliding said arm along said shaft to overhang said detent, and said contact controlling means being effective in response to the movement of said arm to various ones of said positions for placing said contact set in a corresponding one of a like number of conditions.

References Cited in the file of this patent

UNITED STATES PATENTS

| | | |
|---|---|---|
| 1,247,796 | Dean | Nov. 27, 1917 |
| 2,494,450 | Obergfell | Jan. 10, 1950 |